United States Patent Office  
3,477,998  
Patented Nov. 11, 1969

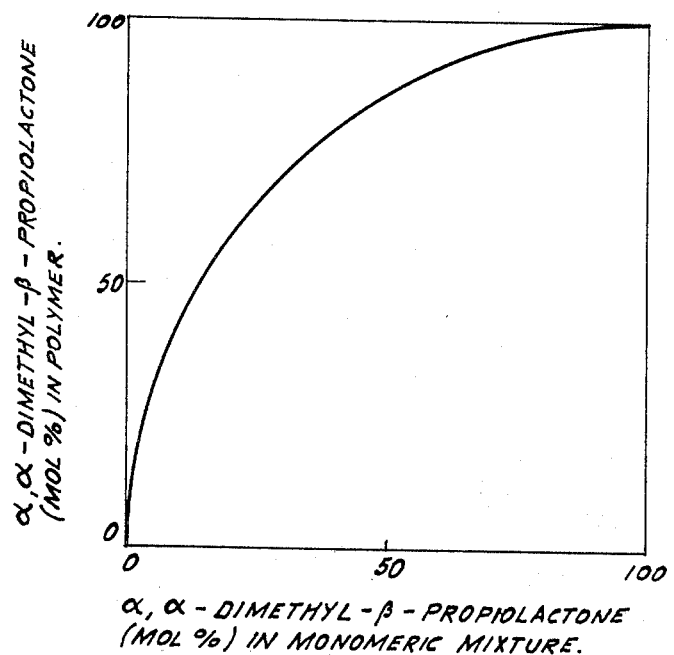

3,477,998  
PRODUCTION OF POLYESTERS FROM LACTONES  
Masataka Nakahara, Takatsuki, Yasuhiro Ogawa, Tarumi, Suita, Yasuhiro Iizuka, Toyonaka, and Yoshihiro Osada, Osaka-fu, Japan, assignors to Kanegafuchi Boseki Kabushiki Kaisha, a corporation of Japan  
Filed July 14, 1966, Ser. No. 565,169  
Claims priority, application Japan, July 24, 1965, 40/45,005; Mar. 25, 1966, 41/18,831  
Int. Cl. C08g 17/017, 17/02  
U.S. Cl. 260—78.3    4 Claims

ABSTRACT OF THE DISCLOSURE $\alpha,\alpha$-Disubstituted-$\beta$-lactone is polymerized in the presence of an organic boron compound to form high molecular polyesters.

---

The present invention relates to a process for preparing high molecular weight polyesters or copolyesters which is characterized by using as a catalyst an organometallic compound whose metal element is the one selected from the group consisting of lithium, sodium, potassium, magnesium, zinc, cadmium, boron and aluminum in the polymerization of $\alpha,\alpha$-disubstituted-$\beta$-lactone of the general formula:

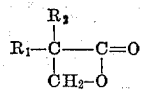

wherein $R_1$ and $R_2$ each represents an alkyl group of 1 to 4 carbon atoms or an aryl group, or in the copolymerization of said lactone, particularly $\alpha,\alpha$-dimethyl-$\beta$-propiolactone with $\epsilon$-caprolactone.

It is known that $\beta$-lactones having two substituents at the $\alpha$-position can be polymerized. The specification of French Patent No. 1,231,163, describes a method for polymerizing $\alpha,\alpha$-disubstituted-$\beta$-lactones by employing an amine, metallic sodium or sodium amide as a polymerization catalyst. It is also known that these lactones, particularly $\alpha,\alpha$-dimethyl-$\beta$-lactone can polymerize in the presence of an anionic polymerization catalyst. British Patent No. 766,347 describes the polymerization of $\alpha,\alpha$-dimethyl-$\beta$-propiolactone in the presence of an amine or a carboxylic acid salt.

In methods shown in the prior art, the polymerization needs a long reaction time, i.e. at least a few days. Furthermore, polyesters prepared according to these methods are extremely unstable to heat due to the fact that catalyst remains in the resulting polymer and as a result these polyesters change color on melting and their molecular weight is inevitably lower.

A principal object of the present invention is to provide high molecular weight thermostable polyesters or copolymers prepared from $\alpha,\alpha$-disubstituted-$\beta$-lactones. Another object of this invention is to provide a process for preparing polyesters or copolyesters useful as a molding material from $\alpha,\alpha$-disubstituted-$\beta$-lactones.

The present invention is characterized by employing as a catalyst an organometallic compound whose metal element is selected from the group consisting of lithium, sodium, potassium, magnesium, zinc, cadmium, boron and aluminum in the polymerization or copolymerization of $\alpha,\alpha$-disubstituted-$\beta$-lactones.

The organometallic compounds employed in the process of the present invention are those in which the metal element at all its valences is combined with the group(s) selected from alkyl groups, aryl groups and halogen atoms and shown by the general formula:

$$R_mMeR'_n$$

wherein Me represents an element selected from the group consisting of lithium, sodium, potassium, magnesium, zinc, cadmium, boron and aluminum, R represents an alkyl group or an aryl group, R' represents a halogen atom, $m$ is an integer from 1 to 3, $n$ has a value from 0 to 3 and $m+n$ indicates the valence of the said metal element.

Exemplary of the compounds of the aforedisclosed general formula are butyllithium, phenyllithium, naphthyllithium, naphthylsodium, butylpotassium, diethylzinc, diethylmagnesium, diethylcadmium, tributylboron, triethylaluminum, triisobutylaluminum, methylzinc chloride, ethylzinc iodide, butylmagnesium chloride, phenylmagnesium bromide, ethylaluminum dichloride and diethylaluminum chloride.

These catalysts are used in amounts ranging from 0.005 to 5% by weight, preferably from 0.01 to 1% by weight, of the monomer(s).

The $\alpha,\alpha$-disubstituted-$\beta$-lactones to be employed in the process of this invention are represented by the following general formula:

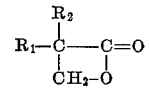

wherein $R_1$ and $R_2$ each is an alkyl group of 1 to 4 carbon atoms or an aryl group. Exemplary of the said $\alpha,\alpha$-disubstituted-$\beta$-lacetones are $\alpha,\alpha$-dimethyl-$\beta$-propiolactone,  
$\alpha,\alpha$-diethyl-propiolactone,  
$\alpha,\alpha$-dipropyl-$\beta$-propiolactone,  
$\alpha,\alpha$-dibutyl-$\beta$-propiolactone,  
$\alpha$-methyl-$\alpha$-ethyl-$\beta$-propiolactone,  
$\alpha$-methyl-$\alpha$-propyl-$\beta$-propiolactone,  
$\alpha$-methyl-$\alpha$-butyl-$\beta$-propiolactone,  
$\alpha$-ethyl-$\alpha$-propyl-$\beta$-propiolactone and  
$\alpha,\alpha$-diphenyl-$\beta$-propiolactone.

These $\alpha,\alpha$-disubstituted-$\beta$-lactones may be employed alone or as a mixture.

The polymerization of the $\alpha,\alpha$-disubstituted-$\beta$-propiolactones may be carried out in the absence or presence of a solvent inert to the said organometallic compounds. The suitable solvents are those which dissolve or swell the resulting high molecular weight polyesters. However, it is prefered that a solvent be employed as a diluent for the monomer and the catalyst, even though the produced polymer is not dissolved or swollen in the solvent.

Exemplary of the preferred solvents are aromatic hydrocarbons such as benzene, toluene and xylene and aliphatic hydrocarbons such as hexane, heptane and petroleum ether. Other suitable solvents are ethers such as dialkyl ether, tetrahydrofuran and dioxane.

Use of the solvent permits agitation of the reaction mixture until the end of the polymerization, and also permits the ready removal of a large amount of the heat of reaction generated in the reaction. According to the process of this invention, a solution of the said $\alpha,\alpha$-disubstituted-$\beta$-lactone having a concentration of 20 to 100% by volume is especially advantageous for the polymerization.

In order to obtain high molecular weight polyesters, it is necessary to remove impurities in the reaction system. Especially water should be carefully removed. Other compounds having active hydrogen such as alcohols, mercaptans, aldehydes and carboxylic acids interfere with the formation of high molecular weight polyesters.

The reaction conditions may be varied over a wide range. The polymerization by the use of the particular catalysts of the present process is advantageous in that the reaction time is short, and the produced polymer has high molecular weight and excellent thermal stability. The polymerization temperature employed depends on the monomer and the catalyst used, but in general the temperature may range from 0 to 120° C. At a higher temperature, the polymerization may proceed more rapidly, but the resulting polymer usually has lower molecular weight and is colored. On the other hand, at a temperature lower than the above-mentioned range, the polymerization proceeds extremely slow and the formation of polyester is practically negligible.

The conditions such as polymerization temperature, concentration of catalyst and amount of the solvent should be determined so that the temperature of the reaction system is not elevated rapidly and the reaction is completed within the range of from a few hours to a few days.

Polyesters produced by the process of the present invention have a structure containing the recurring unit of the general formula:

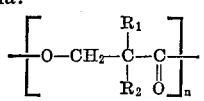

wherein $R_1$ and $R_2$ each represents an alkyl group of 1 to 4 carbon atoms or an aryl group and $n$ is an integer greater than 200. In general, polyesters whose substituents, $R_1$ and $R_2$, are the same are highly crystalline, of relatively high melting point and thermoplastic. Thus, such polyesters are especially useful for fibers, films and molding materials. On the other hand, polyesters whose substituents, $R_1$ and $R_2$, are different are partly or completely amorphous, and films prepared from the said polyesters are transparent or translucent and tough.

The present invention is directed also to the production of copolyesters from these lactones and ε-caprolactone. As mentioned before the polymerization of α,α-dimethyl-β-propiolactone in the presence of an anionic polymerization catalyst is well known in the art. It is also well known that ε-caprolactone polymerizes in the presence of an anionic polymerization catalyst. The specification of British Patent No. 977,230, describes a method of the polymerization of ε-caprolactone in the presence of an organometallic compound.

As mentioned above, it is known that α,α-dimethyl-β-propiolactone and ε-caprolactone each polymerizes alone in the presence of an anionic polymerization catalyst. However, no attempt has not been made to copolymerize α,α-dimethyl-β-propiolactone with ε-caprolactone.

This is so because it is difficult in the ring-opening copolymerization of cyclic compounds, to copolymerize the same kind of cyclic compounds having different numbers of members. The ring-opening copolymerization between different kinds of cyclic compounds is known to be extremely difficult. For example, pairs of monomers such as a lactone and a lactam, a cyclic ether or a vinyl monomer having different reactivities do not give high molecular weight copolymers.

Unexpectedly, we have found that α,α-dimethyl-β-propiolactone, i.e., a four-membered cyclic lactone, readily copolymerizes with ε-caprolactone, i.e., a seven-membered cyclic ether in the presence of the before-mentioned particular organometallic compound, to give high molecular weight copolymers having a preferred melting point, thermal stability and good processing characteristics for forming films, fibers and the like.

From the infrared spectra of the products separated by fractional dissolution using chloroform and gas chromatograms of the hydrolysis products, we have confirmed that the polymers prepared by the present copolymerization process are copolymers of the structure:

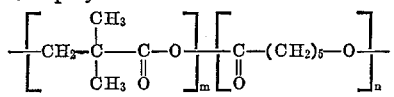

wherein $m$ and $n$ are positive integers.

The reaction conditions of the copolymerization are the same as those described above in respect to the polymerization of α,α-disubstituted-β-lactones, except for the fact that a mixture of the lactone and ε-caprolactone is employed as the monomeric material.

The copolymerization according to the process of this invention may be carried out by using a monomer mixture of a variety of composition. The composition of the copolymer is shown in the accompanying drawing in which the ratio of α,α-dimethyl-β-propiolactone unit in the polymer is indicated as a function of the monomer composition. The drawing showing the composition of the copolymer indicates the composition of the product obtained at the early stage of polymerization as a function of the monomer composition, when the copolymerization of α,α-dimethyl-β-propiolactone and ε-caprolactone is carried out at 50° C. using n-butyllithium as the polymerization catalyst. Although it is clearly seen from the figure that in this case the reactivity of α,α-dimethyl-β-propiolactone is greater than that of ε-caprolactone, a polymer of any composition may be obtained by adjusting the monomer composition.

The said copolymers prepared according to the process of this invention are highly heat-resisting high molecular weight polymers of melting points lying between that of polypivalolactone and that of poly-ε-caprolactone. Thus, their melt fluidity is excellent, and spinning and molding may be performed with great ease. Moreover, fibers, films and the like obtained from the said copolymers have many advantageous characteristics.

The best mode contemplated by the inventors of carrying out their invention is illustrated by the folowing examples. All parts and percentages are by weight.

EXAMPLE 1

To 100 parts by weight of α,α-dimethyl-β-propiolactone, there are added 2 parts of a 25% by weight solution of n-butyllithium in hexane, and the mixture is allowed to stand at 50° C. The reaction mixture becomes turbid within 5 minutes and solidifies completely after 1 hour. After being allowed to stand at 50° C. for 20 hours, the product obtained as blocks is maintained at 90° C. under reduced pressure to remove volatile materials. The thus-produced polymer is proved to be a polyester from its infrared spectrum and is highly crystalline as judged by its X-ray pattern. The reduced viscosity, when measured at 30° C. in a 1% solution in a mixture of 6 parts of phenol and 4 parts of o-chlorophenol, is 3.2. The said polymer melts at 240° C., but it is extremely stable to heat and no change in color is observed after being kept at 270° C. for 30 minutes. Injection molding is possible at 260° C. The melt-viscosity at 260° C. is $5.28 \times 10^3$ poises. The mechanical properties of the molded article thus obtained are as follows:

| | |
|---|---|
| Rockwell hardness | R84 |
| Charpy impact strength (kg. cm./cm.$^2$) | 15.2 |
| Tensile strength (kg./cm.$^2$) | 155 |
| Bending strength (kg./cm.$^2$) | 402 |
| Modulus of bending elasticity (kg./cm.$^2$) | 15,100 |
| Deflection temperature (° C.) | 110 |

EXAMPLE 2

To 100 parts by weight of α, α-dimethyl-β-propiolactone, there are added 5 parts of a 10% by weight solution of triethyl-aluminum in hexane, and the mixture is allowed to stand at 30° C. The reaction mixture becomes turbid within 10 minutes and solidifies within 5 hours. After being allowed to stand for 24 hours, the product obtained as blocks is maintained at 90° C. under reduced pressure to remove volatile materials. The reduced viscosity of the thus-produced polyester, when measured at 30° C. in a 1% solution in a mixture of 6 parts of phenol and 4 parts of o-chlorophenol, is 1.5. The said polyester does not change color, when kept at 270° C. for 30 minutes.

The reduced viscosity of the product obtained by using triisobutylaluminum in place of the afore-mentioned triethylaluminum in an equal amount is 2.1.

EXAMPLE 3

To 95 parts by weight of α-methyl-α-propyl-β- propiolactone, there are added 5 parts of a 25% solution of diethylzinc in hexane, and the mixture is allowed to stand at 30° C. After being allowed to stand for 24 hours, the product obtained as blocks is dried at 90° C. in vacuo. The reduced viscosity of the thus-obtained product, when measured at 30° C. in a 1% solution in methylene chloride, is 1.2 and the melting point is 80° C. There are obtained from the said product transparent, tough and elastic films.

EXAMPLE 4

α, α-Dimethyl-β-propiolactone is polymerized using a variety of organometallic compounds as the catalyst in the same manner as described in Example 1. The results are shown in the folowing table.

| Catalyst | Percent by weight based on the amount of the monomer | Reaction temperature, °C. | Reaction hour | Reduced viscosity |
| --- | --- | --- | --- | --- |
| KC₅H₅ | 0.5 | 50 | 20 | 2.1 |
| NaC₁₀H₉ | 0.5 | 50 | 20 | 2.3 |
| Cd(C₂H₅)₂ | 0.5 | 50 | 20 | 2.2 |
| B(C₄H₉)₃ | 0.5 | 50 | 20 | 2.0 |
| Al(C₂H₅)₂Cl | 0.5 | 50 | 20 | 1.8 |

The catalyst shown in the table is added to the reaction system in the form of a solution in hexane or benzene. The reaction is carried out in a reaction system filled with nitrogen.

EXAMPLE 5

To 97 parts by weight of α-methyl-α-propyl-β- propiolactone, there are added 3 parts of a 5% by weight of phenylmagnesium bromide in ether, and the mixture is allowed to sand at 50° C. for 20 hours. The product obtained as blocks is maintained at 60° C. in vacuo to remove volatile materials. The reduced viscosity of the thus-obtained polyester, when measured in a solution in methylene chloride at 30° C. is 2.4.

An advantage of the catalysts used in the present invention is to provide polymers of excellent thermal stability. The said thermal stability can not be secured by the use of the polymerization catalysts heretofore known in the art. The following is an example using such a known catalyst.

COMPARATIVE EXAMPLE

To 12.5 parts by weight of α,α-dimethyl-β-propiolactone, there is added 1 part of a 3.5% by weight solution of hexamethylenetetramine in chloroform, and the mixture is allowed to stand at 50° C. for 48 hours. The product obtained as blocks is maintained at 90° C. in vacuo to remove volatile materials. The reduced viscosity of the thus-produced polyester, when measured at 30° C. in a 1% solution in a mixture of 6 parts of phenol and 4 parts of o-chlorophenol, is 1.6. The said polyester melts at 240° C., but it begins to color above 200° C. and the coloring becomes extremely rapid in the melting state. Even when the melting is effected in nitrogen stream, the coloring is not avoided. A molded article obtained by injection molding of the said polyester of 260° C. is brown.

EXAMPLE 6

To a mixture of 50 parts of α,α-dimethyl-β-propiolactone and 50 parts of ε-caprolactone, there are added 20 parts of a 1.4% solution of n-butyllithium in hexane, and the polymerization is carried out by allowing the resulting mixture to stand at 50° C. After 10 hours, the reaction mixture is washed with methanol and dried in vacuo at room temperature to obtain 97 parts of a polymer.

The polymer is extracted with hot chloroform to give 23% of a soluble part. The α,α-dimethyl-β-propiolactone units estimated from the ratio of the intensity at 7.17μ to that at 7.28μ in the infrared spectra are 45 mole percent in the chloroform-soluble part and 53 mole percent in the insoluble part.

EXAMPLE 7

To 100 parts of a mixture of α,α-dimethyl-β-propiolactone and ε-caprolactone having the composition described in the following table, there is added 0.2 part of a 9% solution of n-butyllithium in hexane, and the resulting mixture is allowed to stand at 50° C. for 3 days. After the reaction is complete, the polymer produced is washed with methanol, dried in vacuo at room temperature and analyzed according to the method described in Example 6. The results are shown in the following table. The figure indicating the composition of the copolymer is obtained by showing the results in a graphic form.

| Mole percent of α,α-dimethy-β-propiolactone in the monomer mixture | Percent conversion | Mole percent of α,α-dimethy-β-propiolactone in the polymer | Melting point of the polymer (° C.) |
| --- | --- | --- | --- |
| 10 | 5.4 | 46 | 170 |
| 30 | 5.8 | 72 | 214 |
| 60 | 6.1 | 92 | 217 |
| 80 | 3.9 | 95 | 220 |
| 90 | 6.0 | 97 | 224 |

EXAMPLE 8

To a mixture of 70 parts of α,α-dimethyl-β-propiolactone and 30 parts of ε-caprolactone placed in a reaction vessel filled with nitrogen, there are added 5 parts of a 10% solution of triethylaluminum. After being stirred well, the resulting mixture is allowed to stand at 30° C. for 20 hours. After the reaction is complete, the product obtained as blocks is washed with methanol to give 95 parts of a polymer melting at 203° C. The intrinsic viscosity, when measured at 30° C. in a mixture of 6 parts of phenol and 4 parts of o-chlorophenol, is 0.9. The polymer is proved to be a copolymer by the analysis according to the method described in Example 1.

EXAMPLE 9

To a mixture of 20 parts of α,α-dimethyl-β-propiolactone and 80 parts of ε-caprolactone, there are added 5 parts of a 25% solution of diethylzinc, and the resulting mixture is allowed to stand at 100° C. for 15 hours. After the reaction is complete, the product is washed with methanol to give 97 parts of a polymer melting at 47° C. This polymer is proved to be a copolymer by the analysis according to the method described in Example 6.

EXAMPLE 10

A mixture of 50 parts of α,α-dimethyl-β-propiolactone and 50 parts of ε-caprolactone is copolymerized at 80° C. in the presence of 4 parts of a 5% solution of phenylmagnesium bromide in ether. After 10 hours, the product is washed with methanol to give 97 parts of a polymer.

Its infrared spectrum shows the presence of the α,α-dimethyl-β-propiolactone unit and the ε-caprolactone unit. The X-ray differaction pattern shows a peak of poly-ε-caprolactone at 2θ=22.0 besides a peak of poly α,α-dimethyl-β-propiolactone at 2θ=11.5, 15.4 and 17.9.

What we claim is:
1. A method of producing high molecular polyesters which comprises polymerizing an alpha-alpha-disubstituted-beta-lactone of the formula:

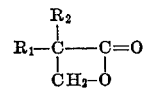

wherein R₁ and R₂ each represent a group selected from alkyl groups of 1–4 carbon atoms and aryl groups, in the presence of tributyl boron, said tributyl boron being present in an amount of 0.005 to 5% by weight based on the monomer(s) used, said polymerization reaction being conducted in an organic solvent inert to said tributyl boron and at a temperature of from 0° C. to 120° C.

2. A method of producing high molecular weight polyesters as claimed in claim 1 wherein the α,α-disubstituted-β-lactone is copolymerized with ε-caprolactone.

3. A method as claimed in claim 2 in which α,α-disubstituted-β-lactone is α,α-dimethyl-β-propiolactone.

4. A method as claimed in claim 1 in which the α,α-disubstituted-β-lactone is selected from the group consisting of α,α-dimethyl-β-propiolactone, α,α-diethyl-β-propiolactone, α,α-dibutyl-β-propiolactone, α,α-dipropyl-β-propiolactone, α-methyl-α-ethyl-β-propiolactone, α-methyl-α-propyl-β-propiolactone, α-methyl-α-butyl-β-propiolactone, α-ethyl-α-propyl-β-propiolactone, α,α-diphenyl-β-propionlactone.

References Cited
UNITED STATES PATENTS

| | | | |
|---|---|---|---|
| 3,021,309 | 2/1962 | Cox et al. | 260—78.3 |
| 3,021,310 | 2/1962 | Cox et al. | 260—78.3 |
| 3,190,858 | 6/1965 | Cox et al. | 260—78.3 |
| 3,259,607 | 7/1966 | Cherdon et al. | 260—78.3 |
| 3,312,753 | 4/1967 | Bailey et al. | 260—823 |

WILLIAM H. SHORT, Primary Examiner

E. NEILSEN, Assistant Examiner